Aug. 9, 1955  E. R. FREDERICK ET AL  2,714,767
FEATHER TREATING APPARATUS
Filed Oct. 3, 1952  2 Sheets-Sheet 1

INVENTORS
Edward R. Frederick
Michael C. Jaskowski
BY
W. J. Eccleston
ATTORNEY

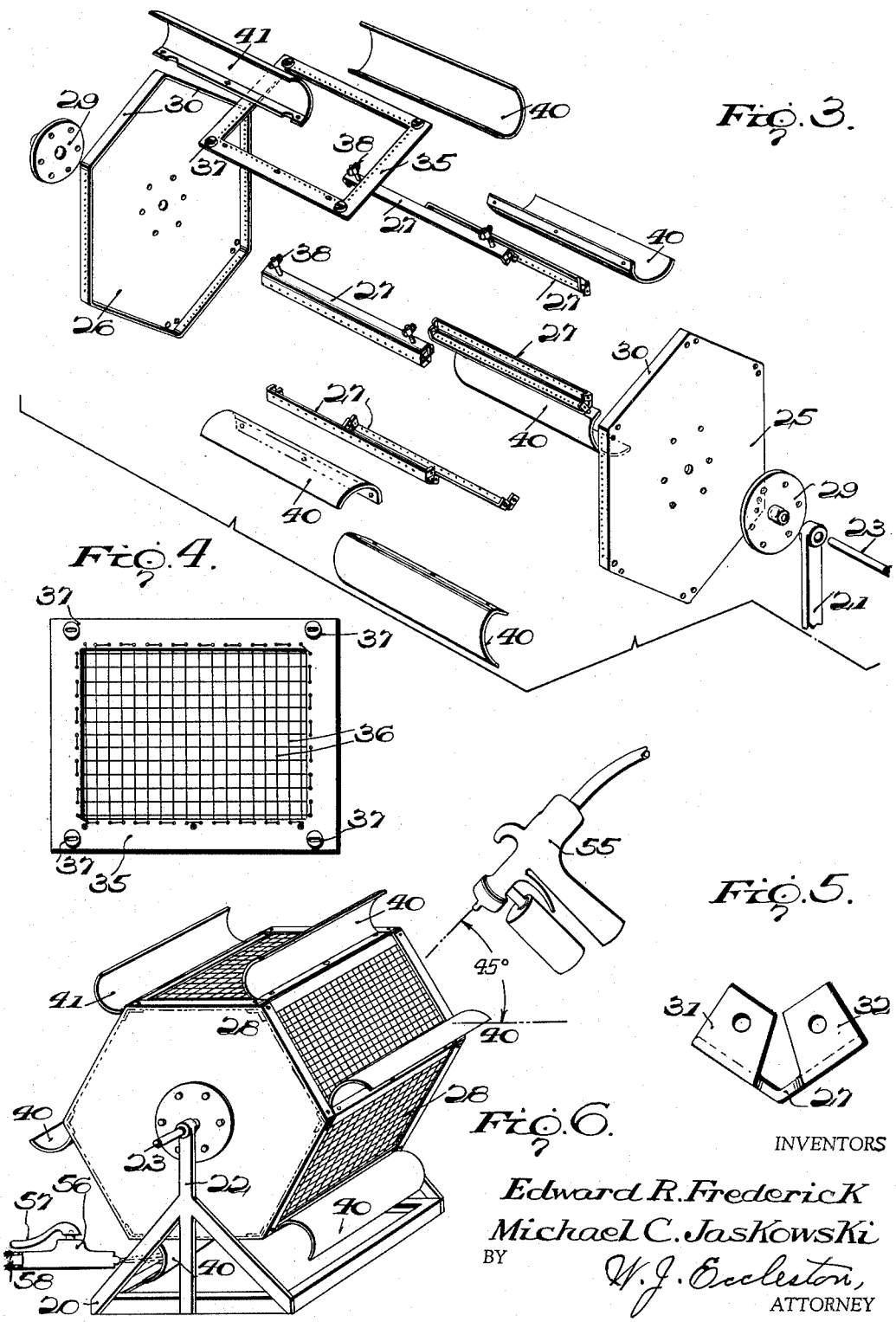

United States Patent Office 2,714,767
Patented Aug. 9, 1955

2,714,767

FEATHER TREATING APPARATUS

Edward R. Frederick and Michael C. Jaskowski, Pittsburgh, Pa., assignors to the United States of America as represented by the Secretary of the Army Application October 3, 1952, Serial No. 313,014

5 Claims. (Cl. 34—2)

This invention relates to feather treating apparatus. In experiments with chicken feathers, which are probably the least expensive and most readily available raw product capable of being processed to become a filler for comforters, pillows, sleeping bags and the like, it has been discovered that the filling power of the feathers may be increased more than 100% by dry cleaning and treating with a chemical, or a resin, wax or elastomer, and then drying with agitation to fluff them.

In explanation of the term "filling power," reference may be made to the report entitled "A Proposed Method for Measuring the Filling Power of Down and Feathers," by Henry A. Sinski, publication No. TD 103037, The Office of Technical Services, U. S. Department of Commerce, and to the article by N. B. Edelman in Textile Research Journal, vol. 17, p. 199 (1947) entitled "Investigation of Methods for Determining the Filling Power of Feathers."

The conventional waterfowl down and feather mixture has a high thickness to weight ratio and high heat insulating characteristics and displays an exceptional drape property, so that it is well suited for use as a filler. The effectiveness of waterfowl feathers and down is attributable to a chemical composition consisting of a resilient protein mass, and to a physical form characterized by a broad, extremely striated and curved vane particle. Unfortunately, waterfowl down and feathers are not available in the United States in sufficient quantity to meet military and civilian requirements. The only material resembling waterfowl feathers which is obtainable in large quantities is chicken feathers, which, however, are straight vaned with their barbs and barbules invariably oriented in one plane; as a result, and also because of their natural wax, chicken feathers pack rather tightly, so that their filling power is low, about one-third of the average filling power of goose or duck feathers, and less than one-fourth the filling power of waterfowl down.

Chicken feathers come on the market in bales labeled "curled chicken feathers": actually they are crushed and washed. The crushing breaks the quills and shafts of many of the feathers and the washing removes most of the dirt and odor and most of the loose pieces of quills, resulting in a mass of soft feathers, feather fragments and feather fibers well suited to serve as the raw product of a filler-making process.

The principal object of this invention is to provide a simple apparatus for drying and fluffing treated chicken and turkey feathers. Another object is to provide means for separating feather fibers from the treated feathers. More specific objects are to provide apparatus which employs little power, which rapidly dries the feathers, which is inexpensive to manufacture and maintain in service, and which will have a long life. An additional object is to provide a feather cage designed for use in spray finishing or coating of feathers. Other objects will be understood from the following description of the preferred embodiment of the invention shown in the accompanying drawings forming a part of this specification.

In said drawings,

Fig. 3 is an exploded perspective of the feather treating cage, omitting the wire netting for clearness;

Fig. 4 is a plan view of the removable side or panel, omitting the vane which is normally attached to it;

Fig. 5 is an end elevation of one of the tie members, on an enlarged scale;

Fig. 6 is a perspective view showing diagrammatically the use of spraying means with the feather treating cage.

Figure 1:
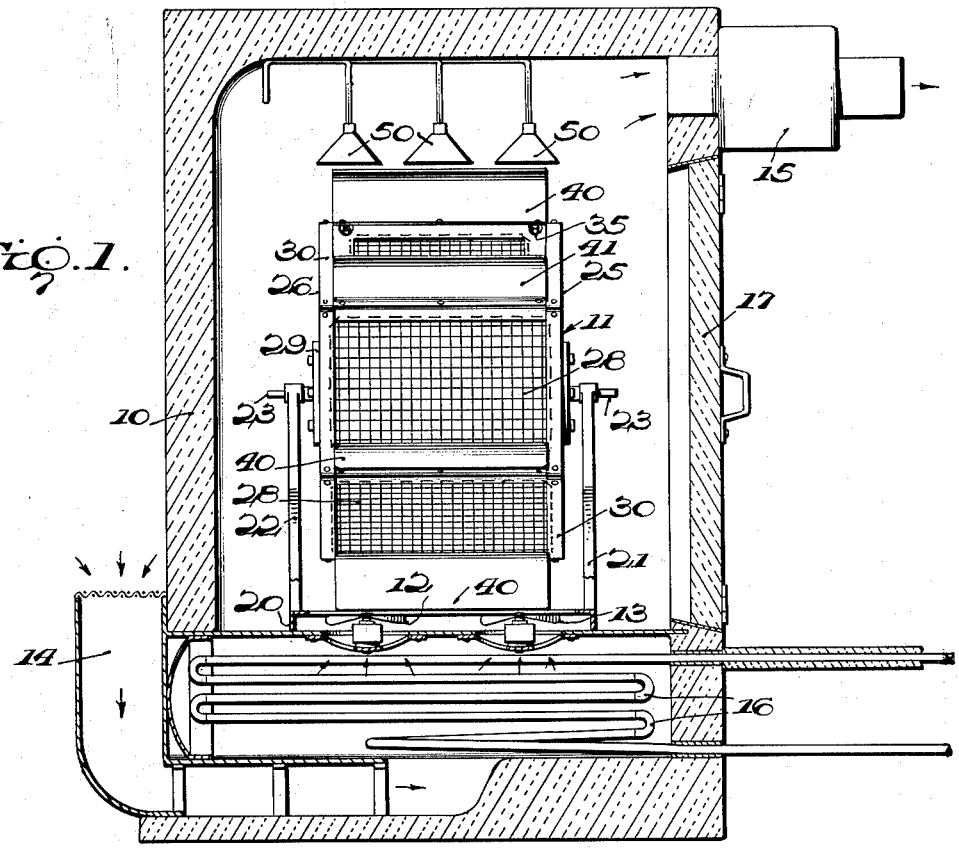
Fig. 1 is a vertical cross section through an oven having a feather treating cage therein.

Referring particularly to the drawings, the complete apparatus (shown somewhat diagrammatically in Fig. 1) comprises an oven 10, a rotary feather treating cage 11 inside the oven, a set of blowers 12, 13, an inlet duct 14 at one end of the oven to admit the air to the blowers, an outlet member 15 at the other end for conveying away the moisture extracted by the air blown on the feathers in cage 11, said outlet member including a cage for collecting feather fibers (as will be understood without illustration), and a source of heat shown as a coil of steam pipe 16 over which the air blast flows to be heated and partially dehydrated before reaching the rotary feather treating cage. Oven 10 conveniently has a hinged door 17.

The feather treating cage comprises a pedestal support 20 of any suitable construction, providing two vertical legs 21, 22 on the upper ends of which are ball bearings (not shown) which rotatably support aligned stub shafts 23. Fixed to shafts 23 to rotate therewith is a foraminous hollow drum or cage 24 which preferably has six sides.

Figure 2:
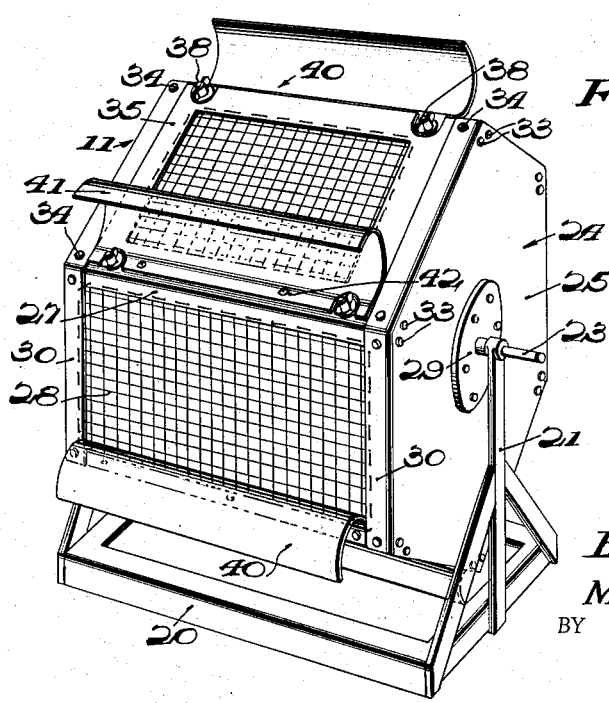
Fig. 2 is a perspective view of the feather treating cage per se.

Drum 24 consists of two imperforate end plates 25, 26 held together in parallelism by straight tie members 27, and wire netting 28 forming the principal part of the outside walls of the drum. The end plates 25, 26 are preferably of aluminum and are reinforced at their centers by discs 29, which may be secured by screws as shown. Similar discs, not shown, may be located on the inside walls of the end plates not only to reinforce the same at the points of support but also to facilitate securing the drum to stub shafts 23. Set screws, not shown, may be used for this purpose. Each end plate is preferably hexagonal and has six narrow integral flanges 30 turned in from its edges to provide supports for the wire netting 28 and other parts to be described. Instead of hexagonal end plates, other polygonal forms may be used. When the end plates are hexagonal, six tie members 27 will be employed to unite the end plates to form a skeleton framework to which the wire netting is secured. Each tie member is preferably a V-shaped elongated metal strap or bar (Fig. 3) whose fins extend at an angle of 60° to each other, the strap having flanges 31, 32 at each end (Fig. 5) by which it may be secured as by rivets 33 to the two end plates. Each tie member is placed inside the marginal flanges 30 of the end members and is secured by rivets 34 to flanges 30 also. The fins of the tie members may be pierced at regular intervals, and the marginal end plate flanges 30 may likewise be pierced, permitting a thin wire or wires, for example piano wire, to be threaded through the perforations and stretched and secured to the flanges to form a grid as shown in Figs. 2 and 4. The criss-crossing of the wires may provide interstices approximating one-fourth or three-eighths of an inch square. Instead of a wire or wires stretched across the open sides of the skeleton framework, a piece of prefabricated wire netting such as commercial galvanized square or round mesh netting may be soldered or otherwise secured along its edges to the framework.

One of the sides of the cage is made removable to give access to its interior so that a charge of wet feathers may be dumped in and the feathers removed when dry and fluffed. As shown in Fig. 4, the removable side consists of a rigid rectangular open frame 35 made of flat metal bars, and a wire netting 36 stretched across the frame opening. Frame 35 has openings 37 near its four corners for receiving turn buttons 38 (or other conventional fastening elements) fixed to the flanges of the two tie members which support frame 35. See Fig. 2. The openings 37 are so located that the frame may be placed on the cage if the turn buttons are turned to the proper position; after the frame is in place the turn buttons are rotated through 90° to lock the frame on the cage.

Secured to all but one of the tie bars are arcuate vanes 40 for receiving the blast of air from the blower and rotating the cage. The sixth vane 41 is like the others but is secured to the removable frame 35. All the vanes are preferably removable and are secured by two or more stud screws 42. Each arcuate vane has a length about equal to the opening for the wire grid adjacent which it lies; each has a width, measured along the chord of the arc, preferably about one-fourth of its length. The arc of each vane is preferably less than 180°, being about 150° to 160°, and each vane is preferably flattened where it is secured by the stud screws 42.

As the cage is particularly designed to be rotated by air currents which are of relatively little power, it must be well balanced. To effect balancing, weights (not shown) may be added to the cage on the side opposite the removable frame 35 (which is the heaviest of the six sides) until the empty cage appears to rotate freely in response to the lightest breeze, for example the breeze created by blowing from one's lungs.

The cage when partly filled with wet feathers from the preceding feather-processing will turn at a rate dependent on the force of the air blast. This rate initially may be 20 to 60 R. P. M. or even faster, and will increase slightly as the weight of the feathers decreases due to evaporation of moisture. The polygonal shape of the cage is of importance because the wet feathers, which initially form clumps or bunches, will be lifted with the revolving cage and then will drop down to strike the bottom, and if not separated, the clumps or bunches will be carried around again to fall to the bottom. This tumbling action breaks up the matted masses of wet feathers and the hot air blast passing through the wire grids reaches the separated feathers, making the drying action much more rapid; also the tumbling with concomitant drying tends to curl straight feathers, which is important in fixing treatments.

In lieu of or in addition to the steam coil 16, a battery of infra-red ray lamps 50 may be mounted on the interior of the oven, each lamp being constructed and located so as to focus its rays on the contents of the cage. Suitable thermostatic control must be provided, in the event of infra-red ray heating, to prevent overheating of the feathers, which would volatilize a natural waxy constituent or even scorch the barbs; either result would lower the filling power, and scorching would make the feathers useless as a filler.

As the feathers dry, they become very fluffy and highly charged with static electricity, due at least in part to frictional contact between the feathers and the walls of the cage. When so charged, the feathers are perfectly adapted either for use in the process of the E. R. Frederick pending application Ser. No. 276,985, filed March 17, 1952, or for other steps in making comforters, pillows and sleeping bags. Drying the feathers by means of an air blast or current directed against the cage has the additional advantage of removing the loose feather fibers which are carried by the air currents out of the even or else are removed from the oven walls after the oven has been shut down. The fluffed, highly charged feathers are best removed from the cage by means of a hose connected to a vacuum chamber, not shown, after which the cage is ready for another batch of wet feathers.

When it is desired to apply a coating to the feathers in the cage, the latter preferably is outside the oven, the arrangement being diagrammatically shown in Fig. 6. Here the spray gun 55 is held about four to eight inches away from the screen surfaces and directs the spray downwardly at an angle of say 30°–45° to the horizontal. On the opposite side of the cage a source of power is located in the form of a nozzle 56 having a hand-operated valve 57 and connected by a hose 58 with a source of compressed air not shown. The heated air stream hits the vanes 40 to rotate the cage partly filled with damp feathers as previously described. This rotates the cage counter-clockwise as viewed in Fig. 6 which lifts the feathers into the spray from spray gun or nozzle 55. As the spray wets the feathers, they are coated and fall or are blown downwardly, only to be lifted up again, and so on, the tumbling turning the feathers over and moving them about so that every barb and barbule is coated. With this process the cage will be rotated very slowly, say 4 to 6 R. P. M., the rate of course being controlled by hand or automatic operation of the air stream valve 57. With such slow rotation, it is possible to cut off the spray (either automatically or manually) when each tie member 27 passes under the spray, thus directing practically all the spray through the screens, so that little is lost or deposited on the parts of the cage. The air stream not only drives the rotary cage, it also agitates and dries and fluffs the feathers and blows small fragments or fibers out of the cage, permitting removal of the small fragments or fibers by a suction hood or similar device, as is known in the art and hence not illustrated. The spray may be a hard wax dispersion or emulsion or solution, or an epon resin solution or a latex type finish.

What we claim is:

1. A feather treating cage comprising a support, a hollow drum having side and end walls and a normally closed opening for receiving and discharging feathers, the side walls being perforate so that air currents may flow transversely through the drum, the end walls being imperforate and being rotatably mounted on said support, tie members rigidly connecting the end walls with each other, the end walls having marginal inturned flanges to which the tie members are also secured, and a plurality of impeller vanes each fixed to a tie member on the outside and extending the length thereof between the end walls, each vane being arcuately curved transversely, the entire cage being dynamically balanced so that it is freely rotatable responsive to the energy of light air currents engaging said vanes transversely.

2. A method of treating land fowl feather products contained in a perforate rotatable cage which consists in simultaneously tumbling, drying and electrostatically charging the feather products, the tumbling being effected solely by the kinetic energy of a stream of dry heated air acting on said cage, said stream of dry heated air removing the moisture from the feather products and also lifting and carrying away feather fibers and fragments through the perforations of the cage.

3. The invention defined in claim 2, wherein the feather products are subjected to spraying through the perforations of the cage with an elastomer, a resin or a wax simultaneously with the tumbling and drying.

4. In combination, a support; a cage rotatably mounted on the support to turn about a horizontal axis, said cage having foraminous walls, a plurality of vanes fixed to the exterior of the cage and extending parallel to the axis of rotation thereof and outwardly from said foraminous walls, means located on one side of the cage near the bottom for directing a strong current of heated dry air against the vanes and through the foraminous walls thereby to effect rotation of the cage by the reaction from the kinetic energy of the current of heated air, and a spraying nozzle for spraying feather-treating compounds, said spraying nozzle being on the opposite side of the cage from the source of heated air and being above the axis of rotation of the cage and directed downwardly at an acute angle to the horizontal.

5. A feather treating apparatus comprising a pair of imperforate polygonal end walls; bearings on the end walls supporting stub axles or shafts by which the cage is rotatably supported to turn about a horizontal axis; straight tie members secured to the polygonal end walls at the angles thereof and forming a rigid assembly with said end walls; perforate side walls secured to said tie members and said end walls to make a unitary polygonal cage which is open only through the perforations in the side walls; means removably securing one of said side walls to two tie members so that the removable side wall may open the cage to permit charging of the cage with a load of wet feathers; a plurality of impeller vanes each fixed to a tie member on the outside and extending the length thereof between the imperforate end walls, each vane being arcuately curved transversely; the cage being dynamically balanced so that it is freely rotatable responsive to the kinetic energy of air currents striking said vanes transversely.

References Cited in the file of this patent

UNITED STATES PATENTS

| | | |
|---|---|---|
| 700,078 | Pennypacker | May 13, 1902 |
| 2,353,827 | Huebsch, Jr. | July 18, 1944 |
| 2,434,476 | Wales | Jan. 13, 1948 |

FOREIGN PATENTS

| | | |
|---|---|---|
| 21,558 | Great Britain | 1903 |